(12) United States Patent
Hernandez et al.

(10) Patent No.: US 9,154,901 B2
(45) Date of Patent: *Oct. 6, 2015

(54) SYSTEM AND METHOD FOR DISABLING AND ENABLING MOBILE DEVICE FUNCTIONAL COMPONENTS

(75) Inventors: Sarah Hernandez, Berkeley, CA (US); Choongil Fleischman, Berkeley, CA (US); Andrew Talbot, Berkeley, CA (US)

(73) Assignee: Location Labs, Inc., Emeryville, CA (US)

(*) Notice: Subject to any disclaimer, the term of this patent is extended or adjusted under 35 U.S.C. 154(b) by 525 days.

This patent is subject to a terminal disclaimer.

(21) Appl. No.: 13/362,520

(22) Filed: Jan. 31, 2012

(65) Prior Publication Data

US 2013/0143512 A1  Jun. 6, 2013

Related U.S. Application Data

(60) Provisional application No. 61/566,646, filed on Dec. 3, 2011.

(51) Int. Cl.
*H04M 11/04* (2006.01)
*H04W 4/00* (2009.01)
*H04W 4/12* (2009.01)
*H04W 4/22* (2009.01)

(52) U.S. Cl.
CPC . *H04W 4/00* (2013.01); *H04W 4/12* (2013.01); *H04W 4/22* (2013.01)

(58) Field of Classification Search
CPC ...... G06F 15/16; G06F 15/173; G06F 15/177
USPC ......... 455/41, 418, 419, 404.1; 709/203, 220, 709/224, 248

See application file for complete search history.

(56) References Cited

U.S. PATENT DOCUMENTS

| | | |
|---|---|---|
| 4,956,825 A | 9/1990 | Wilts et al. |
| 5,434,562 A | 7/1995 | Reardon |
| 5,559,862 A | 9/1996 | Bhagat et al. |
| 5,882,258 A | 3/1999 | Kelly et al. |
| 5,973,683 A | 10/1999 | Cragun et al. |
| 6,023,692 A | 2/2000 | Nichols |
| 6,151,507 A | 11/2000 | Laiho et al. |
| 6,161,008 A | 12/2000 | Lee et al. |
| 6,529,724 B1 | 3/2003 | Khazaka et al. |
| 6,731,746 B1 | 5/2004 | Usami |
| 7,257,367 B2 | 8/2007 | Etuk et al. |

(Continued)

FOREIGN PATENT DOCUMENTS

| | | |
|---|---|---|
| FR | 2863439 A1 | 6/2005 |
| WO | WO2011137279 | 11/2011 |

*Primary Examiner* — Shahriar Behnamian
(74) *Attorney, Agent, or Firm* — Dovas Law, P.C.

(57) ABSTRACT

A computer-implemented method for controlling activity of a mobile device corresponding to a first user is provided. The method includes enabling an application to receive an indication of permitted usage from a second user. An indication of permitted usage of the mobile device is received via the application from the second user. Instructions are transmitted to the mobile communication device to disable or enable at least one functional component of the mobile device responsive to the indication of permitted usage. Further provided is a computing system including at least one memory configured to perform a procedure for controlling activity of a mobile device.

31 Claims, 5 Drawing Sheets

(56) References Cited

U.S. PATENT DOCUMENTS

| | | |
|---|---|---|
| 7,272,633 B2 | 9/2007 | Malik et al. |
| 7,729,945 B1 | 6/2010 | Katz et al. |
| 7,925,690 B2 | 4/2011 | Smith et al. |
| 8,145,417 B1 | 3/2012 | Chitre et al. |
| 8,738,688 B2 * | 5/2014 | Myers et al. .................. 709/203 |
| 2002/0012894 A1 | 1/2002 | Becker |
| 2003/0005306 A1 | 1/2003 | Hunt et al. |
| 2003/0139175 A1 | 7/2003 | Kim |
| 2003/0211889 A1 | 11/2003 | Walker et al. |
| 2004/0161085 A1 | 8/2004 | Horne |
| 2005/0003895 A1 | 1/2005 | Nara |
| 2005/0243771 A1 | 11/2005 | Hardy et al. |
| 2006/0117263 A1 | 6/2006 | Locke |
| 2006/0270476 A1 | 11/2006 | Denkewicz |
| 2007/0039624 A1 | 2/2007 | Roberts et al. |
| 2007/0041545 A1 | 2/2007 | Gainsboro |
| 2007/0203872 A1 | 8/2007 | Flinn et al. |
| 2007/0232340 A1 | 10/2007 | Yamauchi |
| 2007/0263843 A1 | 11/2007 | Foxenland |
| 2008/0172317 A1 | 7/2008 | Deibert et al. |
| 2008/0176585 A1 | 7/2008 | Eldering |
| 2008/0199199 A1 | 8/2008 | Kato et al. |
| 2008/0201469 A1 | 8/2008 | Reasor et al. |
| 2008/0246605 A1 * | 10/2008 | Pfeffer et al. .................. 340/540 |
| 2009/0017750 A1 | 1/2009 | Marcinkiewicz |
| 2009/0055938 A1 | 2/2009 | Samuel |
| 2009/0064316 A1 | 3/2009 | Liao et al. |
| 2009/0089876 A1 | 4/2009 | Finamore et al. |
| 2009/0149203 A1 | 6/2009 | Backholm et al. |
| 2009/0181356 A1 | 7/2009 | Dasgupta |
| 2009/0204471 A1 | 8/2009 | Elenbaas et al. |
| 2009/0275367 A1 | 11/2009 | Reinisch et al. |
| 2009/0286218 A1 | 11/2009 | Johnson et al. |
| 2009/0295562 A1 | 12/2009 | Shuster |
| 2009/0296904 A1 | 12/2009 | Brewer et al. |
| 2009/0298019 A1 | 12/2009 | Rogan et al. |
| 2010/0028844 A1 | 2/2010 | Wiseman |
| 2010/0058446 A1 | 3/2010 | Thwaites |
| 2010/0100618 A1 | 4/2010 | Kuhlke et al. |
| 2010/0113013 A1 | 5/2010 | Karabinis et al. |
| 2010/0145976 A1 | 6/2010 | Higgins et al. |
| 2010/0211887 A1 | 8/2010 | Woollcombe |
| 2010/0235223 A1 | 9/2010 | Lyman |
| 2010/0250352 A1 | 9/2010 | Moore |
| 2010/0268768 A1 | 10/2010 | Kurtenbach et al. |
| 2010/0317420 A1 | 12/2010 | Hoffberg |
| 2010/0330972 A1 | 12/2010 | Angiolillo |
| 2011/0045868 A1 | 2/2011 | Sheha et al. |
| 2011/0047078 A1 | 2/2011 | Ginter et al. |
| 2011/0055546 A1 | 3/2011 | Klassen et al. |
| 2011/0145927 A1 | 6/2011 | Hubner et al. |
| 2011/0231280 A1 | 9/2011 | Farah |
| 2011/0236872 A1 | 9/2011 | Taylor |
| 2011/0302003 A1 | 12/2011 | Shirish et al. |
| 2012/0069131 A1 | 3/2012 | Abelow |
| 2012/0131161 A1 | 5/2012 | Ferris et al. |
| 2012/0142379 A1 | 6/2012 | Park |
| 2012/0143496 A1 | 6/2012 | Chitre et al. |
| 2012/0166285 A1 | 6/2012 | Shapiro et al. |
| 2012/0172100 A1 | 7/2012 | Colar et al. |
| 2012/0226704 A1 | 9/2012 | Boland et al. |
| 2012/0253918 A1 | 10/2012 | Marois et al. |
| 2012/0254949 A1 | 10/2012 | Mikkonen et al. |
| 2012/0258740 A1 | 10/2012 | Mildh et al. |
| 2012/0280916 A1 | 11/2012 | Xia et al. |
| 2012/0323990 A1 | 12/2012 | Hayworth |
| 2013/0040629 A1 * | 2/2013 | Sprigg et al. .................. 455/419 |
| 2013/0091453 A1 | 4/2013 | Kotler et al. |
| 2013/0102286 A1 | 4/2013 | Toksvig et al. |
| 2013/0104246 A1 | 4/2013 | Bear et al. |
| 2013/0111510 A1 | 5/2013 | Baker et al. |
| 2013/0143521 A1 | 6/2013 | Hernandez et al. |
| 2013/0151628 A1 | 6/2013 | Catalano et al. |
| 2013/0185411 A1 | 7/2013 | Martin |
| 2013/0305384 A1 | 11/2013 | Weiss |
| 2014/0057610 A1 | 2/2014 | Olincy et al. |
| 2014/0082509 A1 | 3/2014 | Roumeliotis et al. |
| 2014/0148192 A1 | 5/2014 | Hodges et al. |
| 2014/0180438 A1 | 6/2014 | Hodges et al. |
| 2014/0194095 A1 | 7/2014 | Wynne et al. |
| 2014/0258357 A1 | 9/2014 | Singh et al. |
| 2014/0310403 A1 | 10/2014 | Weiss et al. |

* cited by examiner

SYSTEM AND METHOD FOR DISABLING AND ENABLING MOBILE DEVICE FUNCTIONAL COMPONENTS

CROSS REFERENCE TO RELATED APPLICATION(S)

This application claims the benefit of U.S. Provisional Application No. 61/566,646, filed Dec. 3, 2011, which is incorporated by reference as if fully set forth.

BACKGROUND

With the growing ubiquity of mobile communication devices such as smart phones and the like, has come the increased desire for parents and guardians to monitor and restrict their children's use of such devices. Mobile communication devices are frequently used by children at inappropriate times for inappropriate purposes. Parents and guardians may want to restrict device usage. However, restricting usage of a mobile communication device may be impractical without sacrificing the safety and convenience benefits offered by such device.

SUMMARY

The invention provides a computer-implemented method for controlling activity of a mobile device corresponding to a first user. The method includes enabling an application to receive an indication of permitted usage from a second user. An indication of permitted usage of the mobile device is received via the application from the second user. Instructions are transmitted to the mobile communication device to disable or enable at least one functional component of the mobile device responsive to the indication of permitted usage.

The invention further provides a computing system including at least one memory comprising instructions operable to enable the computing system to perform a procedure for controlling activity of a mobile device corresponding to a first user. The procedure includes enabling an application to receive an indication of permitted usage from a second user. An indication of permitted usage of the mobile device is received via the application from the second user. Instructions are transmitted to the mobile communication device to disable or enable at least one functional component of the mobile device responsive to the indication of permitted usage.

The invention further provides computer-readable media tangibly embodying a program of instructions executable by a processor to implement a method for controlling activity of a mobile device corresponding to a first user. The method includes enabling an application to receive an indication of permitted usage from a second user. An indication of permitted usage of the mobile device is received via the application from the second user. Instructions are transmitted to the mobile communication device to disable or enable at least one functional component of the mobile device responsive to the indication of permitted usage.

BRIEF DESCRIPTION OF THE DRAWING(S)

The following detailed description will be readily understood in conjunction with the appended drawings which illustrate embodiments of the invention. In the drawings.

DETAILED DESCRIPTION OF ILLUSTRATIVE EMBODIMENT(S)

It would be desirable to provide the ability to disable features on a mobile communication device remotely. This invention outlines a method by which a primary mobile communication device account holder with a telecommunication carrier (parent or guardian) is enabled to remotely lock and unlock a mobile communication device operated under the account. In addition to disabling features by locking a device instantaneously on-demand, a user is enabled to create schedules to lock the device for a specific time range on a particular day or group of days. Preset scheduled locks are customized to a particular time range and identified in an application by a unique name by which data is collected. By default all mobile device features are disabled during a lock, but preferences allow any range of specific features to be disabled while others are not, including locking the mobile device to a particular contact or group of contacts and disabling voice calling, electronic text messaging, application execution, or other functional components.

Figure 1:
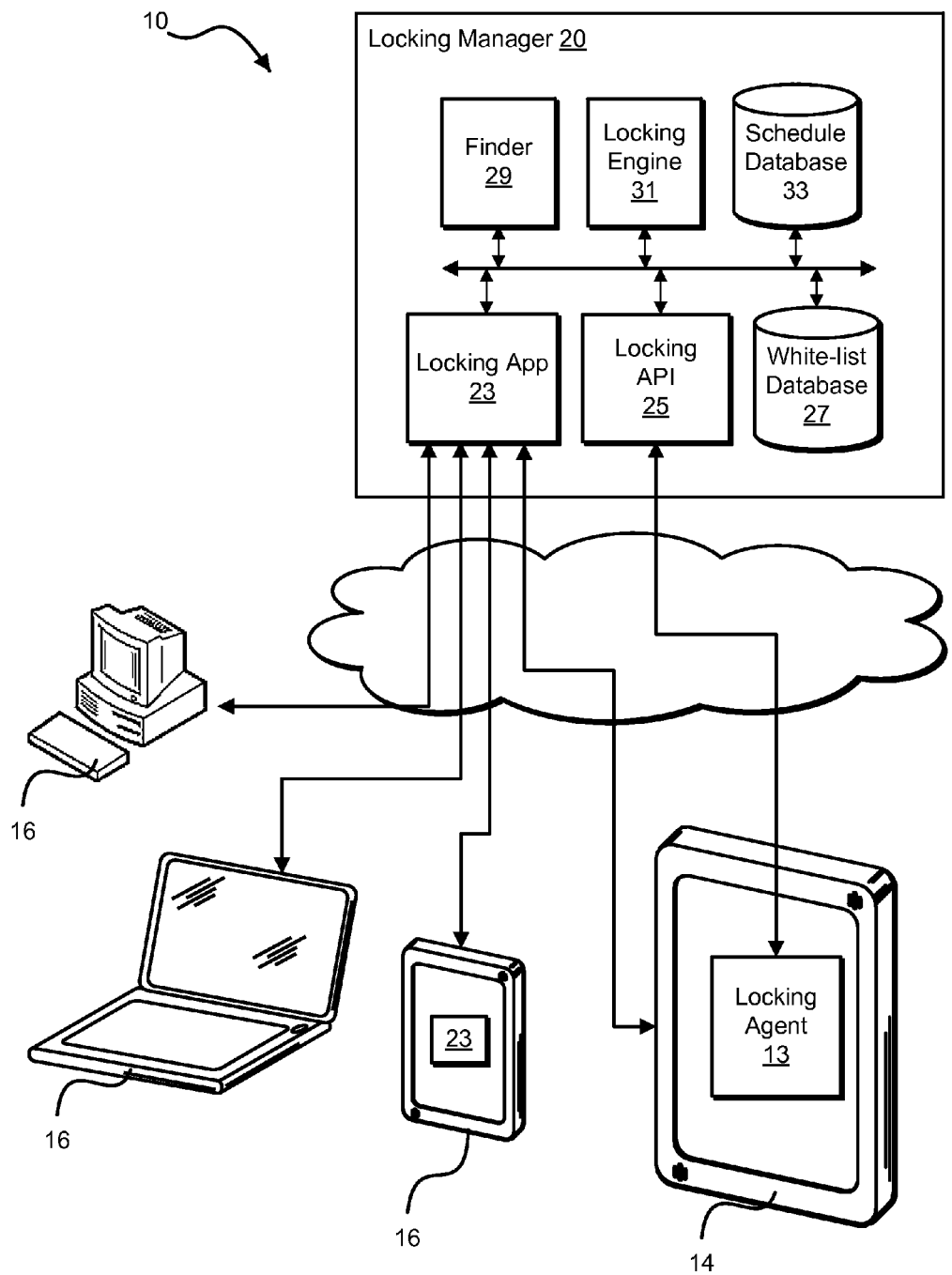
FIG. 1 is a system for disabling and enabling mobile communication device functional components.

Referring to FIG. 1, a system 10 including a locking manager 20 is provided. The locking manager 20 enables a locking application 23, a locking application program interface ("API") 25, a white-list database 27, and a finder 29. The locking manager 20 can be implemented on one or more network accessible computing systems. The locking application 23 can include a web application or other application executed using a client device 16. The locking application 23 can be executed on the client device 16 and/or on a remote system accessible to the client device 16 via a network. During a locking period, software residing on a controlled mobile communication device 14 enables a locking agent 13 to prevent access to user interfaces available on the controlled device 14 by showing a user interface (e.g. a screen) that blocks access to all other user interfaces, thus prohibiting usual use of the controlled device 14.

The locking period can correspond to an on-demand lock activated substantially instantaneously with an activation of a user or a scheduled lock based on times set by a user. If the locking period corresponds to an on-demand lock or a scheduled lock which has an expiration time, the user interface of the controlled device 14 displays the time at which the controlled device 14 will be unlocked. Regardless of whether a locking period results from on-demand or scheduled activation, the locking agent 13 used to apply the lock indicates when a lock is activated and provides the time at which the controlled device 14 will be unlocked if such time is known by the system.

During a locking period, the locking agent 13 preferably directs calls to voicemail, prevents the user of the controlled device 14 from seeing text messages and disallows the user to use other applications installed on the controlled device 14 until the lock is lifted. During the locking period, the controlled device 14 is preferably enabled to call emergency services (e.g. dialing 9-1-1), call white-listed contacts (e.g. calling a parent's phone number), and use white-listed applications (e.g. parent-approved applications). The controlled device 14 preferably remains locatable during a locking period.

The locking manager 20 offers a number of configurable options that may be set by the monitoring user who instigates the lock, for example via a client device 16 executing the locking application 23. A monitoring user can allow select applications ("white-listed applications") to be usable even when the controlled device 14 is locked. White-listed applications can be selected by the monitoring user. A monitoring user can allow select contacts to phone call, text message or otherwise initiate communication with the controlled device 14 at times the locking agent 13 is blocking other contacts. Further, the controlled device 14 can be allowed to phone call, transmit text messages to or otherwise initiate communications with select contacts at times the locking agent 13 is blocking other contacts. The monitoring user can specify a period of time for the controlled device 14 to be locked. The communication device 14 can be locked immediately ("on-demand") or set to lock for a pre-determined period of time, either by a schedule which is specifically entered by the monitoring user (e.g. user specified time ranges) or a preset schedule selected by the monitoring user (e.g. "Late Night" or "School Hours").

An on-demand lock is preferably implemented via the locking application 23 as a quick one-touch action in a user interface (e.g. "Lock/Unlock" button) that disables some or all features on the controlled device 14 instantly. It uses an on/off switch functionality. Hence the lock will remain active until it is removed, preferably through another one-touch action (e.g. "Lock/Unlock" button). The on-demand lock can alternatively be controlled by a timer wherein it becomes unlocked after a predetermined time period (e.g. 30 minutes).

In a first example implementation of the invention, a monitored child user "Sally" stayed out late one evening past curfew. As a punishment her parents limit her use of her mobile communication device 14 via the locking application 23 by clicking an on-demand "lock" button which locks her device 14 instantly via the locking agent 13. The controlled device 14 remains locked until her parents re-enable the device 14 by clicking the "unlock" button via the locking application 23. Until then, Sally cannot send or receive text messages or phone calls and is restricted from using applications or other mobile features, except for white-listed phone numbers, white-listed applications and emergency services.

In addition to locking a mobile device on-demand, a monitoring user can create scheduled lock times that are determined by their start and end time spanning a day or multiple days which can repeat on a daily, weekly or monthly basis. The time range can be set for a number of minutes or extend for hours, days or weeks, or other suitable time ranges. Schedules are named and saved for use at a later time in order to prevent having to recreate them when they are deactivated. Schedules remain editable after creation and can be deleted entirely. When a scheduled lock is active, the lock screen on the controlled device displays and includes the time the lock will expire.

In a second example implementation of the invention, a monitored child's mother "Sally's mom" schedules a lock to occur from 3:45pm to 4:30pm during Sally's piano lesson every Wednesday. During that time, Sally's mobile communication device 14 displays a lock screen explaining the time at which her phone's lock will expire (e.g. 4:30pm).

In addition to recurring scheduled locks, the locking application 23 provides customizable locks that allow a monitoring user such as a parent to control the device of a monitored subject such as a child during particular preset time periods generally accepted by parents as undesirable for device usage (e.g. "Late Night Hours" and "School Hours"). Being a preset customizable option, the schedule by default is available in the locking application 23, and there is preferably a user interface enabled one-touch action to activate the schedule, as in the on-demand lock. The time range is preferably editable for flexibility.

Figure 4:
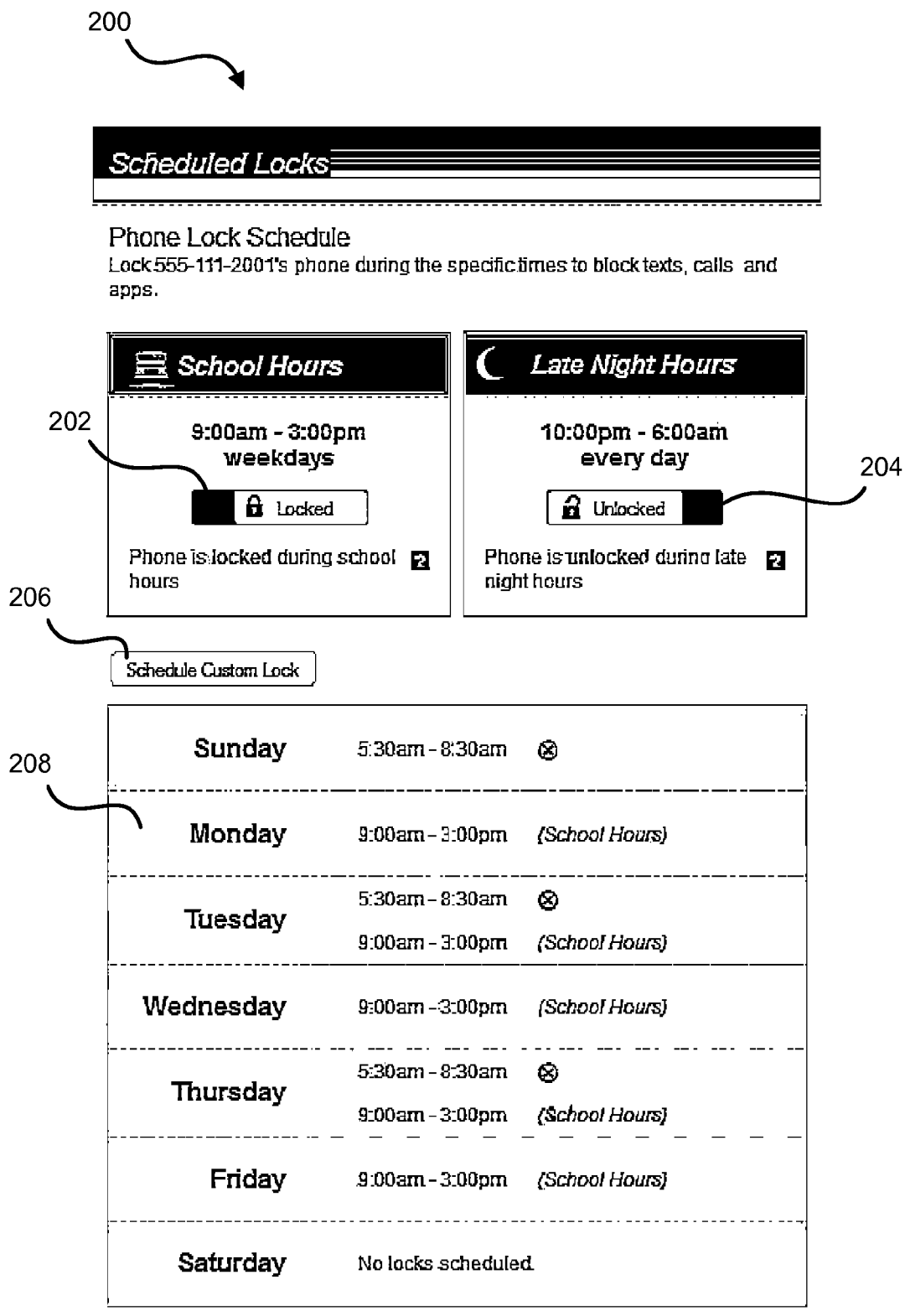

In a third example implementation of the invention, a monitored child ("Billy") served detention at school for sending text messages with his mobile device 14 while in class. His parents activate the preset scheduled lock time via the locking application 23 for a "School Hours" activity window as shown in FIG. 4. Therefore, Monday through Friday from 9:00am-3:00pm, corresponding to the system lock preset, Billy's mobile device 14 is locked automatically. If Billy tries to use his mobile device 14 during the lock, he will see a notice on his mobile device user interface telling him his phone is locked until 3:00pm.

A plurality of device functional components are affected by the locking agent 13 including functional components which enable features such as short message service ("SMS"), phone calling, and application execution. The locking agent 13 also enables access by a monitoring user via the locking application 23 to contact lists saved on the controlled device 14 to enable locking of select contacts. If a particular contact's phone number, email address or other identifier does not exist on a saved contact list, the monitoring user can enter the mobile number or other identity-driven information to block communication with the particular contact. Locking is further extendible to other functional components of a communication device.

Both the on-demand and scheduled disabled ("locked") states can occur at the same time, in which case the stricter of the two settings persists. For example, if a child has a scheduled lock activated on her mobile device 14 wherein she is only restricted from sending text messages, and the on-demand lock is in its default configuration wherein every device feature is disabled, all features on her mobile device will be disabled should her parents activate the on-demand lock for her device 14.

The user of a disabled device 14 is preferably enabled to override disabling instructions from the locking manager 20 through an interface generated via the locking agent 13. Should the locking aspects of a disabled device 14 be overridden, a notification is preferably sent to the monitoring user via the locking manager 20 or directly via the controlled device 14. The details of the notification include information concerning the activity that overrode the lock, including contact details, application used and other information related to the override. For example, an indication can be transmitted to the monitoring user of a contact the monitored user communicated with using the mobile communication device 14 after the lock was overridden. Notifications can be sent direct from the mobile communication device 14 to the monitoring user through a telecommunications network, for example via SMS, IM or email, or alternatively, to the monitoring user via the locking manager 20, for example via SMS, IM or email or via the locking application 23. Accordingly, when a lock is overridden the monitoring user is informed of what action was performed with the device 14 after the override, thereby permitting the monitoring user to assess whether the monitored user was justified in initiating the override.

Figure 2:
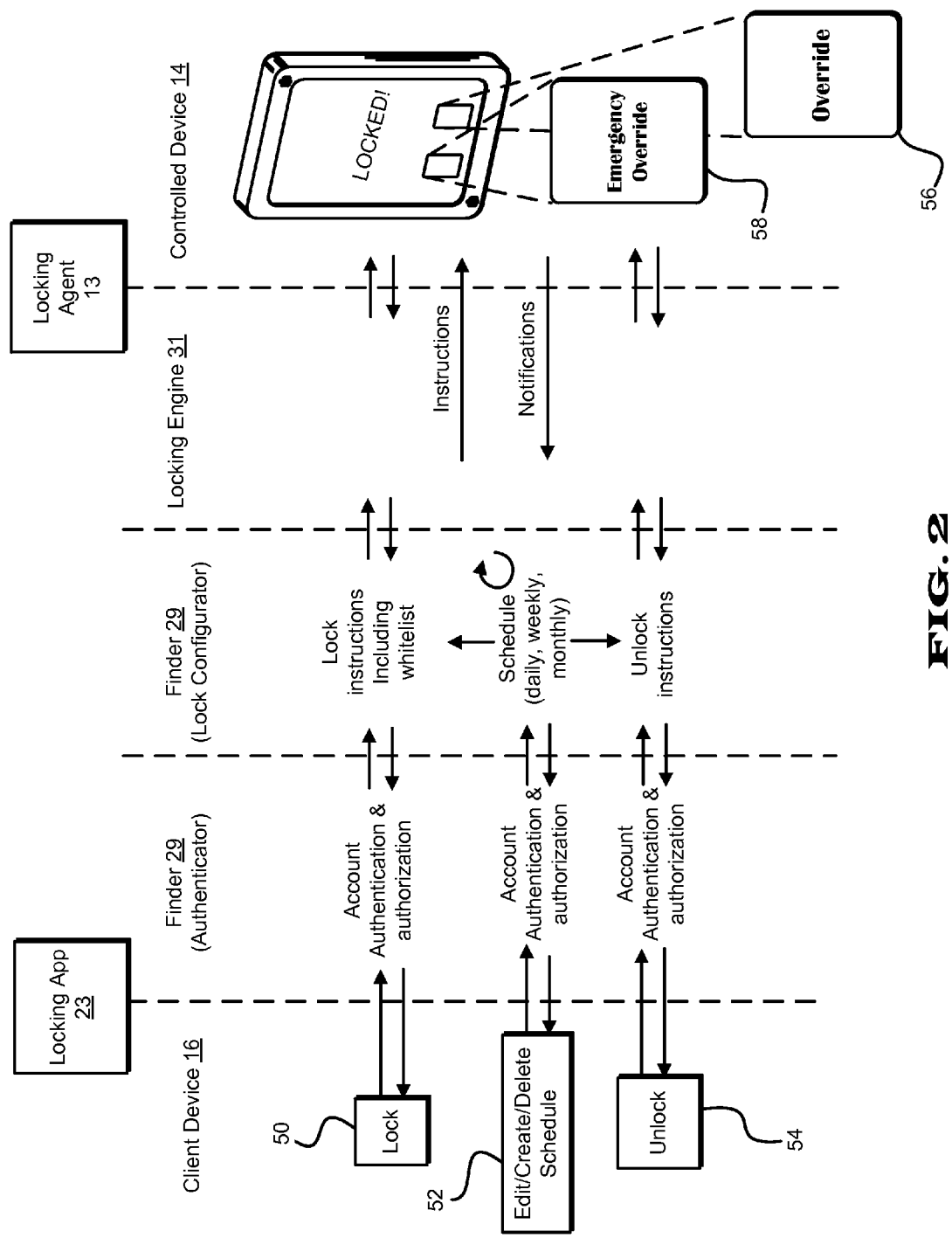
FIG. 2 is a diagram showing a process for locking a mobile communication device according to the invention.

Example implementations of the locking mechanism enabled by the system 10 are described below with reference to FIGS. 1 and 2.

A monitoring user can click a lock button 50, an edit/create/delete schedule button 52, and an unlock button 54 in an interface enabled by the locking application 23 via the client device 16.

The locking manager 20 receives account information via the finder 29. Authentication and authorization of account information is performed via the locking manager 20 and locking agent 13 (if installed). After authentication, the edit/create/delete schedule button 52 permits a monitoring user to schedule locks for storage and access in a schedule database 33.

The locking manager 20 checks if the locking agent 13 is installed on the mobile device 14 to be controlled. If the locking agent 13 is installed, the locking manager 20 provides lock instructions using the locking engine 31 including white-listed contacts and white-listed applications responsive to a lock command, issued for example via the lock button 50. Alternatively, the locking manager 20 provides unlock instructions, issued for example via the unlock button 54.

The locking manager 20 further checks for scheduled locks at a predetermined interval (e.g. each minute). If it is determined a lock is scheduled during a check, the locking manager 20 initiates the lock on the controlled device 14, if not already locked. If it is determined a lock is not scheduled during a check, the locking manager 20 initiates an unlock of the device 14 if the device 14 is locked, unless the lock had been initiated via the lock button 50 as an indefinite lock or a lock subject to a predetermined expiration.

The locking agent 13 performs the locking of the controlled device 14, and a state is sent to the locking application 23 for access by the client device 16 of the monitoring user. The user of the controlled device 14 is informed, for example via the state, of the lock and of the next time the device 14 is scheduled to be unlocked. For an on-demand lock, the controlled device 14 is locked indefinitely or for a predetermined period (e.g. 30 minutes), preferably based on the option of the monitoring user. For a scheduled lock, the controlled device 14 is locked for a set period of time and the scheduled unlock time is preferably shown via the user interface of the controlled device 14 (e.g. "4:30pm"). The locking agent 13 can enable a regular override button 56 or an emergency override button 58, wherein if activated by a monitored user, the locking agent 13 transmits back notification to the locking manager 20 whether regular override or emergency override is activated, which information is provided to the monitoring user. An override can be configured to unlock some or all locks set by the finder 29, corresponding for example to some or all features of the mobile device 14.

Figure 3:
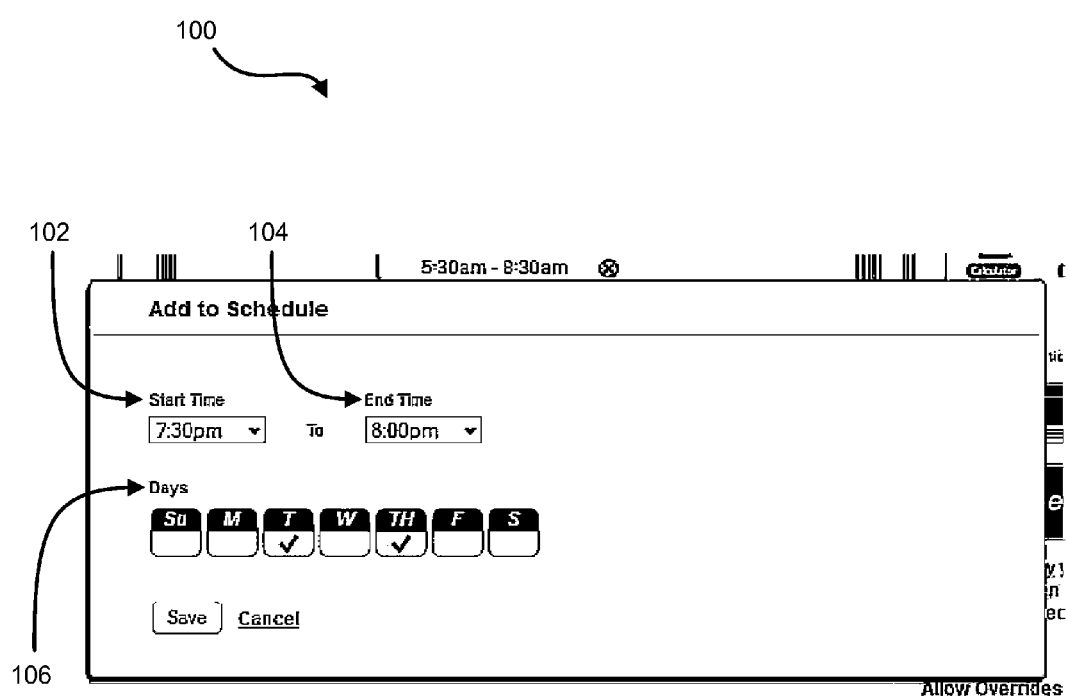
FIGS. 3 and 4 are screen captures showing user interfaces for scheduling locking times of a mobile communication device according to the invention.

FIGS. 3 and 4 are screen captures showing example user interfaces enabled by the locking application 23 for scheduling locking times of a mobile communication device 14. Referring to FIG. 3, in an interface 100 a monitoring user can set a start time 102 and an end time 104 on particular days 106. Referring to FIG. 4, in an interface 200, a monitoring user can select preset schedules to lock the device 14. A "School Hours" preset schedule button 202 corresponds to the period between 9:00am and 3:00pm on weekdays. A "Late Night Hours" preset schedule button 204 corresponds to the period between 10:00pm and 6:00am each day. Custom schedules can be entered by a user via the "Schedule Custom Lock" button 206. A current schedule including preset and custom schedules selected by the monitoring user is shown in a listing 208.

Figure 5:
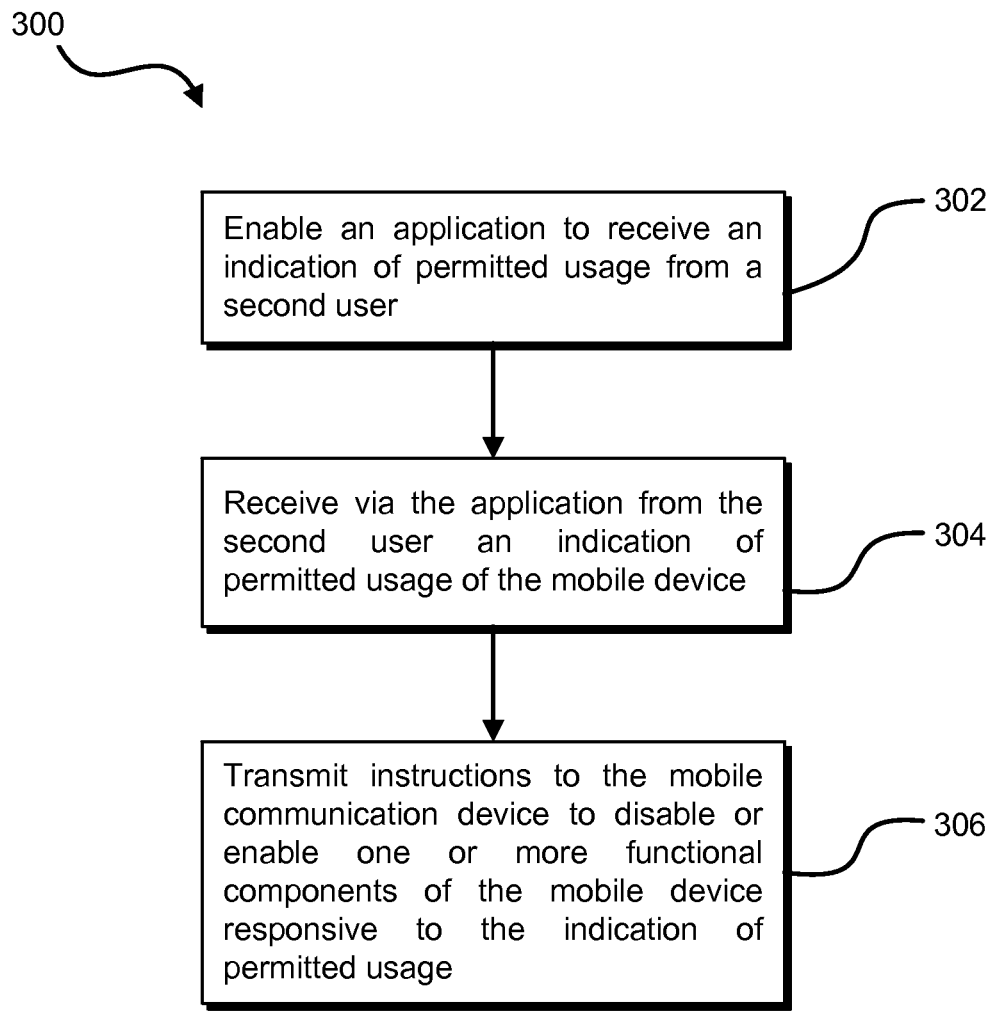
FIG. 5 is a diagram showing a method for controlling activity of a mobile device according to the invention.

Referring to FIG. 5, a computer-implemented method is shown for controlling activity of a mobile device corresponding to a first user according to the invention. An application is enabled to receive an indication of permitted usage from a second user (step 302). An indication of permitted usage of the mobile device is received via the application from the second user (step 304). Instructions are transmitted to the mobile communication device to disable or enable one or more functional components of the mobile device responsive to the indication of permitted usage (step 306).

While embodiments of the invention have been described in detail above, the invention is not limited to the specific embodiments described above, which should be considered as merely exemplary. Further modifications and extensions of the invention may be developed, and all such modifications are deemed to be within the scope of the invention as defined by the appended claims.

What is claimed is:

1. A computer-implemented method for controlling activity of a mobile device corresponding to a first user, the mobile device comprising a user interface, the method comprising:
    enabling an application to receive an indication of permitted usage from a second user;
    receiving via the application from the second user an indication of permitted usage of the mobile device;
    transmitting instructions to the mobile device to disable or enable at least one functional component of the mobile device responsive to the indication of permitted usage;
    receiving via the user interface of the mobile device a command from the first user to override the instructions transmitted to the mobile communication device;
    enabling the at least one functional component in direct response to the override command from the first user; and
    transmitting notification to the second user indicating that the at least one functional component has been enabled by the command from the first user.

2. The computer-implemented method of claim 1, further comprising receiving the indication of permitted usage with an indication to substantially instantaneously enable or disable the at least one functional component.

3. The computer-implemented method of claim 1, further comprising receiving the indication of permitted usage with an indication of a schedule during which the at least one functional component is enabled or disabled.

4. The computer-implemented method of claim 1, further comprising:
    providing the second user with at least one preset schedule during which the at least one functional component is enabled or disabled;
    receiving the indication of permitted usage from the second user with a selection of the at least one preset schedule; and
    transmitting instructions to the mobile communication device to disable or enable the at least one functional component of the mobile device pursuant to the selected at least one preset schedule.

5. The computer-implemented method of claim 4, wherein the at least one preset schedule corresponds to at least one of late night hours and school hours.

6. The computer-implemented method of claim 1, further comprising:
    receiving the indication of permitted usage with an indication of which of a plurality of functional components of the mobile device are enabled or disabled.; and
    transmitting instructions to the mobile communication device to enable or disable the at least one functional component of the mobile device responsive to the indication of which of the plurality of functional components of the mobile device are enabled or disabled.

7. The computer-implemented method of claim 6, further comprising:
    providing the second user with a listing of the plurality of functional components;

receiving the indication of permitted usage with a selection of the at least one functional component from the listing of the plurality of functional components; and transmitting instructions to the mobile communication device to enable or disable the at least one functional component as selected from the listing.

8. The computer-implemented method of claim 1, further comprising:

receiving the indication of permitted usage with an indication of at least one contact; and transmitting instructions to the mobile communication device to enable or disable the at least one functional component of the mobile device with respect to the at least one contact responsive to receiving the indication of permitted usage.

9. The computer-implemented method of claim 1, further comprising enabling a message screen on the mobile device indicating that the at least one functional component is disabled.

10. The computer-implemented method of claim 1, further comprising enabling a message screen on the mobile device indicating a period of time for which the at least one functional component is disabled.

11. The computer-implemented method of claim 1, further comprising:

receiving via the application an indication of at least one application usable when the at least one functional component is disabled; and transmitting instructions to the mobile communication device to not disable the at least one application when the at least one functional component is disabled.

12. The computer-implemented method of claim 1, further comprising:

receiving via the application an indication of at least one contact which is contactable when the at least one functional component is disabled; and transmitting instructions to the mobile communication device to permit communications with the at least one contact when the at least one functional component is disabled.

13. The computer-implemented method of claim 1, further comprising transmitting instructions to the mobile device to redirect incoming communications when the at least one functional component is disabled.

14. The computer-implemented method of claim 1, further comprising transmitting instructions to the mobile device to redirect incoming telephone calls to voicemail when the at least one functional component is disabled.

15. The computer-implemented method of claim 1, further comprising transmitting instructions to the mobile device to permit communications with an emergency service provider when the at least one functional component is disabled.

16. The computer-implemented method of claim 1, further comprising transmitting instructions to the mobile device to permit location determination functionality on the mobile device when the at least one functional component is disabled.

17. The computer-implemented method of claim 1, further comprising:

receiving from the second user via the application an indication of at least one of a contact which is contactable and an application which is usable when the at least one functional component is disabled; and transmitting instructions to the mobile communication device to permit communications with the contact and permit usage of the application when the at least one functional component is disabled.

18. The computer-implemented method of claim 1, further comprising:

enabling via the application an interface accessible to the second user;

receiving a one-touch action via. the interface from the second user; and disabling the at least one functional component responsive to the one-touch action from the second user.

19. The computer-implemented method of claim 18, further comprising:

receiving another one-touch action via the interface from the second user; and enabling the at least one functional component responsive to the another one-touch action from the second user.

20. The computer-implemented method of claim 1, further comprising:

receiving the indication of permitted usage from the second user with an indication of a schedule during which the at least one functional component is enabled or disabled; and enabling the second user to edit the schedule via the application.

21. The computer-implemented method of claim 1, further comprising transmitting instructions to the mobile communication device to disable the at least one functional component of the mobile device for a predetermined period of time responsive to the indication of permitted usage.

22. The computer-implemented method of claim 1, further comprising enabling the mobile device to provide an indication of a time when the mobile communication device will be re-enabled via the user interface of the mobile communication device.

23. The computer-implemented method of claim 1, further comprising:

receiving the indication of permitted usage from the second user with an indication of at least one of a daily schedule, weekly schedule and monthly schedule during which the at least one functional component is enabled or disabled; and transmitting instructions to the mobile communication device to disable or enable the at least one functional component of the mobile device responsive to the at least one of the daily schedule, the weekly schedule and the monthly schedule.

24. The computer-implemented method of claim 1, wherein the at least one functional component enables at least one of electronic messages, telephone communications and application execution.

25. The computer-implemented method of claim 1, further comprising:

accessing a contact list via the mobile communication device;

providing the contact list to the second user;

receiving the indication of permitted usage from the second user with a selection of at least one contact from the contact list; and transmitting instructions to the mobile communication device to disable communication with the at least one contact.

26. The computer-implemented method of claim 1, further comprising transmitting to the second user an indication of a contact communicated with using the mobile communication device after the at least one functional component is enabled.

27. The computer-implemented method of claim 1, further comprising transmitting to the second user an indication of an application used with the mobile communication device after the at least one functional component is enabled.

28. A computing system including at least one memory comprising instructions operable to enable the computing system to perform a procedure for controlling activity of a mobile device corresponding to a first user, the mobile device corn user interface, the procedure comprising:
- enabling an application to receive an indication of permitted usage from a second user;
- receiving via, the application from the second user an indication of permitted usage of the mobile device;
- transmitting instructions to the mobile device to disable or enable at least one functional component of the mobile device responsive to the indication of permitted usage;
- enabling a message screen on the user interface of the mobile device indicating a period of time for which the at least one functional component is disabled;
- receiving via the user interface of the mobile device a command from the first user to override the instructions transmitted to the mobile communication device;
- enabling the at least one functional component in direct response to the override command from the first user; and
- transmitting notification to the second user indicating that the at least one functional corn one t has been enabled by the command from the first user.

29. Non-transitory computer-readable media tangibly embodying a program of instructions executable by a processor to implement a method for controlling activity of a mobile device corresponding to a first user, the mobile device comprising a user interface, the method comprising:
- enabling an application to receive an indication of permitted usage from a second user;
- enabling via the application an interface accessible to the second user;
- receiving a one-touch action via the interface from the second user;
- receiving via the application from the second user an indication of permitted usage of the mobile device in the form of a one-touch action via, the interface from the second user;
- transmitting instructions to the mobile communication device to disable or enable at least one functional component of the mobile device responsive to the one-touch action from the second user;
- receiving via the user interface of the mobile device a command from the first user to override the instructions transmitted to the mobile communication device;
- enabling the at least one functional component in direct response to the override command from the first user; and
- transmitting notification to the second user indicating that the at east one functional component has been enabled by the command from the first user.

30. The computer-implemented method of claim 26, further comprising enabling the user interface on the mobile device to indicate that the at least one functional component is disabled and to provide an override button, wherein the override command from the first user is generated responsive to the first user actuating the override button.

31. The computer-implemented method of claim 1, further comprising enabling a user interface on the mobile device indicating that the at least one functional component is disabled and providing a non-emergency override button and an emergency override button, wherein:
- the override command from the first user is generated responsive to the first user actuating at least one of the override buttons; and
- the notification transmitted to the second user indicates whether the override command corresponds to an emergency or a non-emergency based on whether the non-emergency button or the emergency button is actuated.

\* \* \* \* \*

UNITED STATES PATENT AND TRADEMARK OFFICE
CERTIFICATE OF CORRECTION

PATENT NO. : 9,154,901 B2  
APPLICATION NO. : 13/362520  
DATED : October 6, 2015  
INVENTOR(S) : Hernandez et al.

Page 1 of 1

It is certified that error appears in the above-identified patent and that said Letters Patent is hereby corrected as shown below:

IN THE CLAIMS

At Column 9 line 5, delete the word "corn" and insert therefor --comprising--.

At Column 9 line 24, delete the word "corn one t" and insert therefor --component--.

Signed and Sealed this  
Twenty-third Day of August, 2016

Michelle K. Lee  
*Director of the United States Patent and Trademark Office*